United States Patent Office 3,515,758
Patented June 2, 1970

3,515,758
PROCESS FOR THE PRODUCTION OF ETHYLENE COMPOUNDS
Duncan Clark, Percy Hayden, and John Charlton, Norton-on-Tees, England, assignors to Imperial Chemical Industries Limited, London, England, a corporation of Great Britain
No Drawing. Filed June 2, 1966, Ser. No. 554,652
Claims priority, application Great Britain, June 17, 1965, 25,672/65
Int. Cl. C07c 43/00, 43/04
U.S. Cl. 260—614
9 Claims

ABSTRACT OF THE DISCLOSURE

In the production of vinyl ethers from vinyl acetate and an alcohol using a palladium compound as catalyst, the vinyl acetate is provided in the form of a vinyl acetate/acetic acid mixture derived from the liquid phase palladium catalyzed oxidation of ethylene in the presence of a palladium compound, the reaction medium comprising 1,1- or 1,2-diacetoxyethane and at most 30% acetic acid. The vinyl acetate and water distilled from this reaction medium undergoes phase separation into a water phase and a vinyl acetate/acetic acid phase, the latter being a suitable feedstock for the vinyl ether forming process.

The present invention relates to the production of ethylenic compounds, in particular to the production of vinyl ethers.

The process according to the present invention is for the production of alkyl vinyl ethers and comprises a first stage (Stage I) comprising contacting ethylene with a salt or co-ordination compound of palladium, in the presence of at most a minor amount of water, and in the presence of acetate ions, molecular oxygen, a copper salt, acetic acid and 1,1-diacetoxyethane or 1,2-diacetoxyethane, the concentration of the acetic acid in the process not exceeding 30% by weight of the reaction medium, separating a mixture comprising vinyl acetate, acetic acid and water, and removing from said separated mixture at least some of the water by phase separation, and a second stage (Stage II) comprising contacting the remainder of said separated mixture containing vinyl acetate and acetic acid with an aliphatic alcohol in the presence of a salt or coordination compound of palladium.

The overall reaction sequence may be represented as follows:

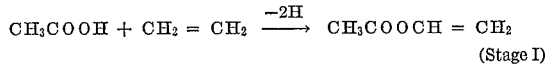
(Stage I)

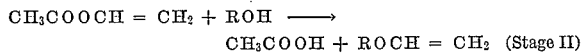
$CH_3COOH + ROCH = CH_2$ (Stage II)

Preferably the concentration of acetic acid in Stage I does not exceed 20%, more preferably 10%, by weight of the reaction medium. Thus all or part of the acetic acid which is formed when the vinyl acetate is reacted with the alcohol in Stage II may be recycled to the process and/or fresh acetic acid may be introduced to the process.

In the reaction of the ethylene in Stage I, the 1,1-diacetoxyethane and 1,2-diacetoxyethane, with the acetic acid, may make up substantially the whole of the reaction medium. For example, if 10% by weight of the reaction medium is acetic acid, approximately 90% of the reaction medium may be one or both of the diacetoxyethanes. The 1,2-diacetoxyethane is preferred for use in the process.

The concentration of water in the reaction medium in Stage I should be as low as possible, preferably less than 5% by weight of the reaction medium, more preferably less than 1%. The concentration of water in Stage II of the process is also preferably maintained at a low level, concentrations of up to 5% by weight of the reaction medium, for example, being tolerable.

The palladium salt or co-ordination compound of palladium which may be used in the process may be the same in Stage I as in Stage II. Preferred palladium salts are palladous acetate, palladous nitrate and palladous chloride, although other palladous halides such as the bromide may also be used. The co-ordination compounds of palladium include lithium chloro-palladite, sodium chloropalladite and bis-(benzonitrile) dichloropalladium II, and may be added as such or may be formed in situ. For example, lithium chloropalladite may be formed in situ by the separate addition of palladous chloride and lithium chloride. The concentration of palladium used in both stages of the process may be $10^{-5}$ to $10^{-2}$ molar, preferably $10^{-4}$ to $10^{-3}$ molar.

In both stages of the process it may be advantageous for halide ions to be present, and a halide such as an alkali metal halide may be added in addition to halide ions provided in other ways such as in the form of the palladous salt or co-ordination compound of palladium. Chloride ions are preferred halide ions in Stage I and bromide ions in Stage II, and are suitably added in the form of lithium chloride or lithium bromide respectively. The concentration of the alkali metal halide is preferably up to 100 moles per mole of the salt or co-ordination compound of palladium, more preferably about 5 moles per mole of the salt or co-ordination compound of palladium. It is particularly desirable however that in Stage I of the process the total halide ion concentration should not exceed 0.2 molar, and even more desirably it should be 0.08 molar or below.

Especially when Stage I is carried out at low halide ion concentrations, such as 0.05 molar and below, it is advantageous to add a nitrate, nitrite, nitrosyl, nitro- or nitroso compound to the reaction mixture. Suitable nitrates include the alkali metal nitrates, for example lithium nitrate, and nitric acid. Up to 1.0 mole of the nitrogen compound may be added per litre of solution. Preferably 0.05 to 0.15 mole is added per litre of solution.

It may be useful, when the acetic acid formed in Stage II is recycled to Stage I, to remove the acetic acid and some of the unchanged alcohol together with the palladium salt or co-ordination compound of palladium from Stage II, and, after removing the alcohol by suitable means such as distillation, to recycle the palladium salt or co-ordination compound of palladium together with the acetic acid to Stage I. The palladium salt or co-ordination compound of palladium may then be continuously removed from Stage I and, after suitable treatment, be recycled to Stage II.

An alkali metal or alkaline earth metal acetate may be used in Stage I to provide acetate ions, for example lithium acetate, sodium acetate, magnesium acetate, calcium acetate or barium acetate, and is preferably present in the maximum concentration obtainable consistent with its solubility in the reaction medium, usually 0.1 to 0.5 molar.

The copper salt in Stage I is provided to act as a redox system and may be either or both the cupric and cuprous forms, for example, cupric and cuprous acetate and cupric and cuprous nitrate. The salt may be present in a molar concentration of 0.05 to 0.3 molar, preferably about 0.1 molar. A redox system may also be provided in Stage II and may suitably be a cooper salt, particularly copper bromide, in a concentration of 0.05 to 0.3 molar, preferably about 0.1 molar. Copper halides, particularly copper chloride, present in Stage II also exert a beneficial effect on the activity of the palladium salt or co-ordination compound of palladium, and are preferably present in a ratio of 1 to 50 moles per mole of the salt or co-ordination compound of palladium.

Stage I is preferably carried out at a temperature in the range 50° C. to 180° C., particularly 110° C. to 130° C., and Stage II in the range −50° C. to 200° C., particularly −20° C. to 80° C.

It is preferred to introduce the ethylene and molecular oxygen in Stage I of the process as a gas mixture containing 3 to 10% by volume oxygen and the remainder ethylene. The overall operating pressure may advantageously be 300 to 500 pounds per square inch gauge (20 to 34 atmospheres), preferably 400 pounds per square inch gauge. The rate of introduction of the gase mixture may be 500 to 2000 litres per litre of reaction mixture per hour, the higher rates for example about 1600 litres per hour, being preferred to ensure rapid removal of reaction products, especially water, from the reaction zone. It is also desirable that the oxygen content of the exit gas from Stage I of the process after the removal of organic compounds should be not greater than about 5% by volume.

The product of Stage I of the process comprising vinyl acetate and water with a minor amount of acetic acid (for example 2 to 20% by weight) and possibly some acetaldehyde may suitably be removed from the reaction medium in the exit gas stream. Acetaldehyde, which boils at a lower temperature than the vinyl acetate, water and acetic acid, may be separated by partial condensation from the gas stream, or by subsequent distillation of a condensed mixture of vinyl acetate, water, acetic acid and acetaldehyde. At temperatures preferably up to 50° C., more preferably in the range 20° C. to 50° C., the resulting mixture of vinyl acetate, acetic acid and water may be separated into two phases, viz., vinyl acetate and the major part of the acetic acid in the one phase, and water and a minor part of the acetic acid in the other phase. The vinyl acetate/acetic acid mixture thus separated from the water phase is suitable for immediate use in Stage II of the process, to which it is preferably introduced continuously.

The alcohol which may be used in Stage II of the process may contain 1 to 20 carbon atoms, particularly 1 to 6 carbon atoms. Examples of alcohols which may be used are methanol, ethanol, n-propanol, isopropanol, n-butanol and isobutanol.

Stoichiometrically equivalent proportions of vinyl acetate and the alcohol may be used in Stage II of the process or one or the other, preferably the vinyl acetate, may be used in excess as the solvent. An inert solvent may also be used in this stage of the process. For example an aliphatic hydrocarbon such as pentane, hexane, octane or cyclohexane; an aromatic hydrocarbon, such as benzene, toluene or xylene; an ether, such as diethyl ether; an ester, such as dinonyl phthalate; or other well known solvents such as tetrahydrofuran, dioxane, dimethylacetamide, sulpholane, dimethyl sulphoxide or benzonitrile, may be used.

Stage II of the process may advantageously be carried out in the presence of a base in a concentration between 0.1 times and twice the molar concentration of the salt or co-ordination compound of palladium, particularly 0.2 to 0.4 times the molar concentration of the salt or co-ordination compound of palladium. The term "base" is intended to include compounds capable of neutralising acids stronger than acetic acid, and includes the salts of a strong base and a weak acid, particularly lithium acetate.

To minimise the formation of by-product acetals, in Stage II of the process a stationary concentration of the acetal derived from the alcohol used, suitably up to 10% by weight, preferably 5% by weight, may be maintained in the the reaction medium. If water is present this concentration may suitably be reduced, e.g., up to 5% by weight of water may be used with up to 5% by weight of acetals.

The addition of acetic acid together with the vinyl acetate fed to Stage II of the process does not affect the yield of the ether, and may be advantageous as the removal of acetic acid from Stage II of the process may be considerably facilitated by maintaining a stationary concentration of acetic acid. The stationary concentration of acetic acid in Stage II may be up to 50% by weight of the reaction medium, but is preferably 15 to 30% by weight of the reaction medium.

Stage II of the process may be carried out at atmospheric pressure or at elevated pressure. However as it is usually desirable to remove the alkyl vinyl ether as soon as it is formd, the process may advantageously be carried out at a reduced pressure. A pressure of up to 10 atmospheres may be used, preferably 0.1 to 1 atmosphere.

In one form of the invention a gas mixture comprising 3 to 10% by volume oxygen, the remainder being ethylene, is passed continuously at a pressure between 300 and 500 pounds per square inch gauge into a substantially anhydrous reaction medium, comprising 10% by weight acetic acid and 90% by weight 1,2-diacetoxy ethane, containing lithium chloride, palladous chloride, lithium acetate and copper acetate. The temperature is maintained between 110° C. and 130° C., and a rapid gas rate of between 1200 and 2000 litres per litre of reaction mixture per hour is maintained. A mixture of vinyl acetate, acetaldehyde, acetic acid and water is removed in the exit gas stream, condensed therefrom, and the acetaldehyde removed by distillation. The vinyl acetate and acetic acid phase is next separated from the water phase and heated to between 20° C. and 40° C., with lithium chloropalladite, lithium chloride, methanol, additional acetic acid, acetal and up to 5% by weight of water. The partial pressure of the organic components is maintained at 50 to 200 mm. and the resulting methyl vinyl ether is continuously removed. A continuous purge is taken of the liquid content of the reaction vessel from which acetic acid is removed in amounts sufficient to maintain its initial concentration. The acetic acid thereby removed is recycled to Stage I of the process. The catalyst which is removed may be recycled and/or fresh catalyst may be introduced.

The process may be used to make alkyl vinyl ethers which are useful as polymerisable monomers and intermediates in the production of pyridine and pyridine derivatives.

The process according to the invention will now be further described by means of the following examples:

EXAMPLE 1

A gas mixture of ethylene, oxygen and nitrogen in which the partial pressure of the oxygen was 16 lbs./ square inch gauge was continuously introduced into a vessel containing:

1,2-diacetoxyethane—800 mls.
Acetic acid—100 mls.
Benzonitrile—100 mls.
Copper acetate—0.1 mole
Lithium acetate—0.2 mole
Lithium chloride—0.1 mole
Palladous chloride—$5 \times 10^{-3}$ mole The total pressure was 400 lbs./square inch gauge and the gas rate 1600 litres/hour. The temperature was 120° C.

The product was removed in the exit gas stream and the acetaldehyde removed by a subsequent distillation. The residual liquid make was:

|  | G./hour |
|---|---|
| Vinyl acetate | 112 |
| Acetic acid | 28 |
| Water | 26 | which split into two phases, i.e., a water phase of composition

| | | |
|---|---|---|
| Vinyl acetate | 8% | |
| Acetic acid | 26% | weight 24 g. |
| Water | 66% | | and a vinyl acetate phase of composition

| | | |
|---|---|---|
| Vinyl acetate | 78% | |
| Acetic acid | 15% | weight 142 g. |
| Water | 7% | |

The latter layer was made up to 200 mls. with methanol and fed continuously to a stirred flask provided with a water-cooled condenser and thermometer. The flask contained:

Vinyl acetate—160 mls.
Methanol—120 mls.
Lithium chloropalladite—$5 \times 10^{-4}$ molar The solution temperature was 20° C. and a gas rate of 464 litres per hour of argon was passed through the reaction mixture.

The products removed in the argon gas stream were:

| | Mole/litre/hour |
|---|---|
| Methyl vinyl ether | 0.5 |
| Acetaldehyde | 0.02 |
| Acetal | 0.01 |

EXAMPLE 2

A gas mixture of ethylene, oxygen and nitrogen in which the partial pressure of the oxygen was 16 lbs./square inch gauge was continuously introduced into a vessel containing:

1,2-diacetoxyethane—950 mls.
Acetic acid—50 mls.
Copper acetate—0.05 mole
Lithium acetate—0.4 mole
Lithium chloride—0.11 mole
Palladous chloride—$5 \times 10^{-3}$ mole The total pressure was 400 lbs./square inch gauge and the gas rate 1600 litres/hour. The temperature was 120° C.

The product was removed in the exit gas stream and the acetaldehyde removed by subsequent distillation. The residual liquid make was:

| | G./hour |
|---|---|
| Vinyl acetate | 69 |
| Acetic acid | 15 |
| Water | 14 | which split into two phases, i.e., a water phase of composition:

| | | |
|---|---|---|
| Vinyl acetate | 14.5% | |
| Acetic acid | 21.5% | weight 14 g. |
| Water | 64.0% | | and a vinyl acetate phase of composition:

| | | |
|---|---|---|
| Vinyl acetate | 80% | |
| Acetic acid | 14% | weight 84 g. |
| Water | 6% | |

The latter layer was made up to 140 mls. with methanol and fed continuously to a stirred flask provided with a water-cooled condenser and thermometer. The flask contained:

Vinyl acetate—160 mls.
Methanol—120 mls.
Lithium chloropalladite—$5 \times 10^{-4}$ molar The solution temperature was 20° C., and a gas rate of 464 litres per hour of argon was passed through the reaction mixture.

The products removed in the argon gas stream were:

| | Mole/litre/hour |
|---|---|
| Methyl vinyl ether | 0.5 |
| Acetaldehyde | 0.02 |
| Acetal | 0.01 |

We claim:
1. In a process for the production of a vinyl ether by reacting vinyl acetate with an alkanol containing 1 to 20 carbon atoms at a temperature in the range −50° C. to 200° C. in the presence of a salt or coordination compound of palladium selected from the group consisting of palladous chloride, palladous bromide, palladous acetate, lithium chloropalladite, sodium chloropalladite or bis-(benzonitrile) dichloro-palladium II, the improvement which comprises using as feedstock for the process a vinyl acetate/acetic acid mixture obtained by contacting ethylene at a temperature in the range 50° C. to 180° C. with a salt or coordination compound of palladium selected from the group consisting of palladous chloride, palladous acetate, lithium chloropalladite, sodium chloropalladite or bis-(benzonitrile)dichloro-palladium II in the presence of:

(a) at most 5% by weight of the reaction medium of water,
(b) acetate ions provided by an alkali metal or alkaline earth metal acetate,
(c) molecular oxygen,
(d) a copper redox salt,
(e) acetic acid not exceeding 30% by weight of the reaction medium, and
(f) 1,1-diacetoxyethane or 1,2-diacetoxyethane;

separating from the reaction zone a mixture comprising vinyl acetate, acetic acid and water; removing at least some of the water from said separated mixture by phase separation; and feeding the remaining vinyl acetate/acetic acid mixture to the vinyl ether-forming process.

2. The process of claim 1 in which the vinyl acetate/acetic acid mixture is obtained by contacting ethylene at a temperature in the range 50° C. to 180° C. with $10^{-5}$ to $10^{-2}$ molar palladous chloride, palladous bromide or palladous acetate in the presence of:

(a) at most 5% by weight of the reaction medium of water,
(b) acetate ions provided by an alkali metal alkaline earth metal acetate,
(c) molecular oxygen,
(d) copper acetate or copper chloride,
(e) acetic acid not exceeding 20% by weight of the reaction medium, and
(f) 1,2-diacetoxyethane;

and separating by distillation a mixture comprising vinyl acetate, acetic acid and water and removing from said distillate at least some of the water by phase separation at a temperature up to 50° C.; and thereby obtaining said vinyl acetate/acetic acid mixture.

3. The process of claim 1 in which acetic acid formed in the vinyl ether-forming stage of the process is recycled to the vinyl acetate-forming stage of the process.

4. The process of claim 1 in which a stationary concentration of acetal, formed as by-product in the vinyl ether-forming process, is maintained in the reaction medium of said vinyl ether-forming process.

5. The process of claim 4 in which the stationary concentration of acetal is up to 5% by weight and 5% by weight of water is present.

6. The process of claim 1 in which halide ions derived from an alkali metal halide are present in the vinyl ether and/or vinyl acetate-forming process.

7. The process of claim 1 in which the phase separation takes place at a temperature of up to 50° C.

8. The process of claim 1 in which the pressure in the vinyl acetate-forming stage of the process is 20 to 34 atmospheres and in the vinyl ether-forming stage up to 10 atmospheres.

9. The process of claim 1 in which the vinyl acetate/acetic acid mixture obtained after the phase separation is introduced continuously to the vinyl ether-forming stage of the process.

References Cited
UNITED STATES PATENTS

| | | | |
|---|---|---|---|
| 3,210,152 | 10/1965 | Van Helden et al. | 260—497 XR |
| 3,221,045 | 11/1965 | McKeon et al. | |
| 3,257,448 | 6/1966 | Clark et al. | |
| 3,262,969 | 7/1966 | Clark et al. | 260—497 |
| 3,277,158 | 10/1966 | Schaeffer | 260—497 |
| 3,277,159 | 10/1966 | Schaeffer | 260—497 |
| 3,285,970 | 11/1966 | Schaeffer | 260—615 |
| 3,306,930 | 2/1967 | Copelin et al. | 260—497 |

FOREIGN PATENTS

| | | |
|---|---|---|
| 952,718 | 3/1964 | Great Britain. |
| 964,001 | 7/1964 | Great Britain. |
| 975,683 | 11/1964 | Great Britain. |
| 975,709 | 11/1964 | Great Britain. |
| 6411879 | 4/1965 | Netherlands. |

OTHER REFERENCES

Moiseev et al., Proceeding of Royal Acad. of Sci., vol. 133, Nos. 1–6, July-August 1960, pp. 801–804.

BERNARD HELFIN, Primary Examiner

U.S. Cl. X.R.

260—497